Figure 1:
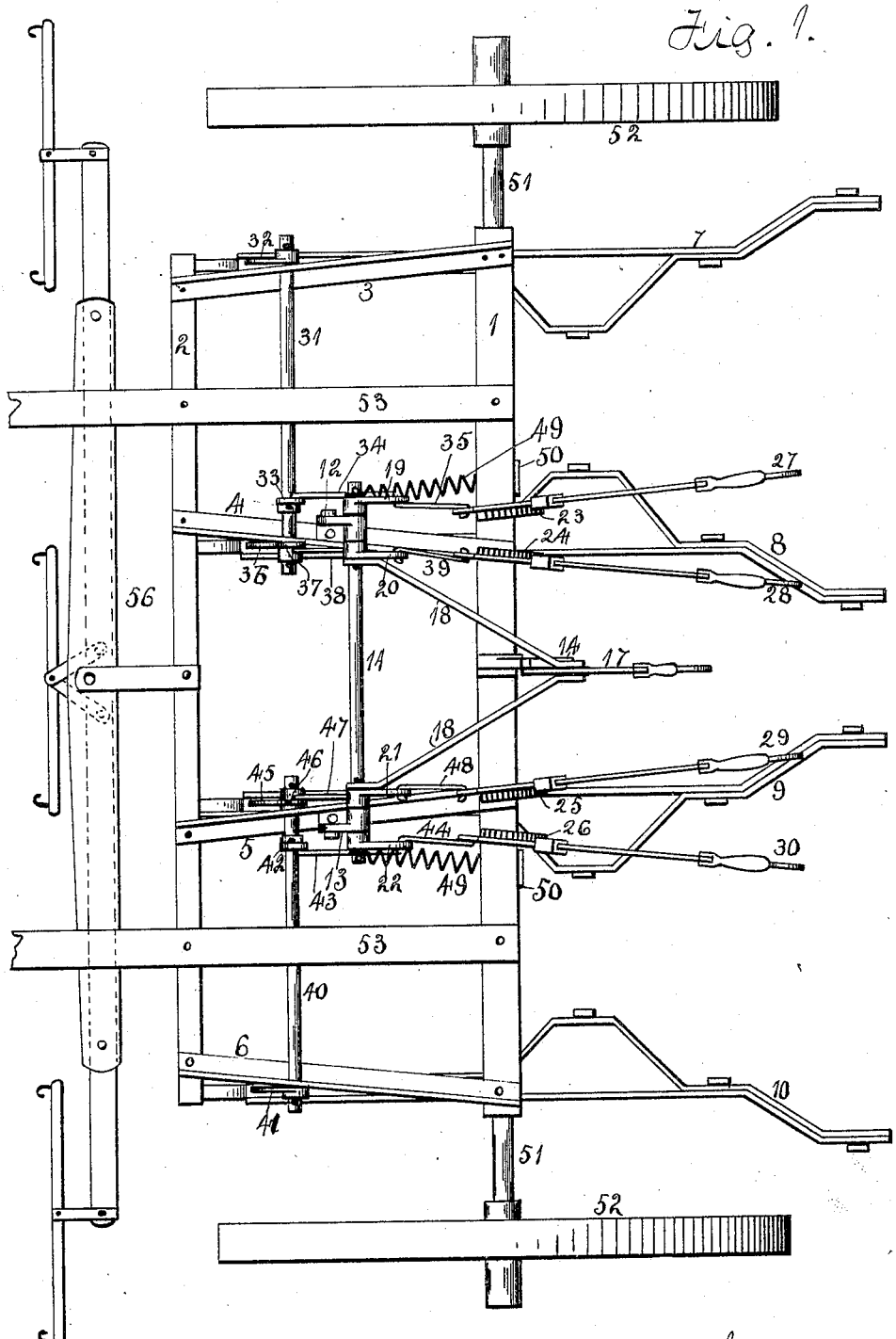

No. 789,104. PATENTED MAY 2, 1905.
F. E. PEARSON.
TWO ROW CULTIVATOR.
APPLICATION FILED OCT. 10, 1904.

3 SHEETS—SHEET 1.

Witnesses:
E. Behel.
F. F. Cox.

Inventor:
Frank E. Pearson
By A. O. Behel
Atty.

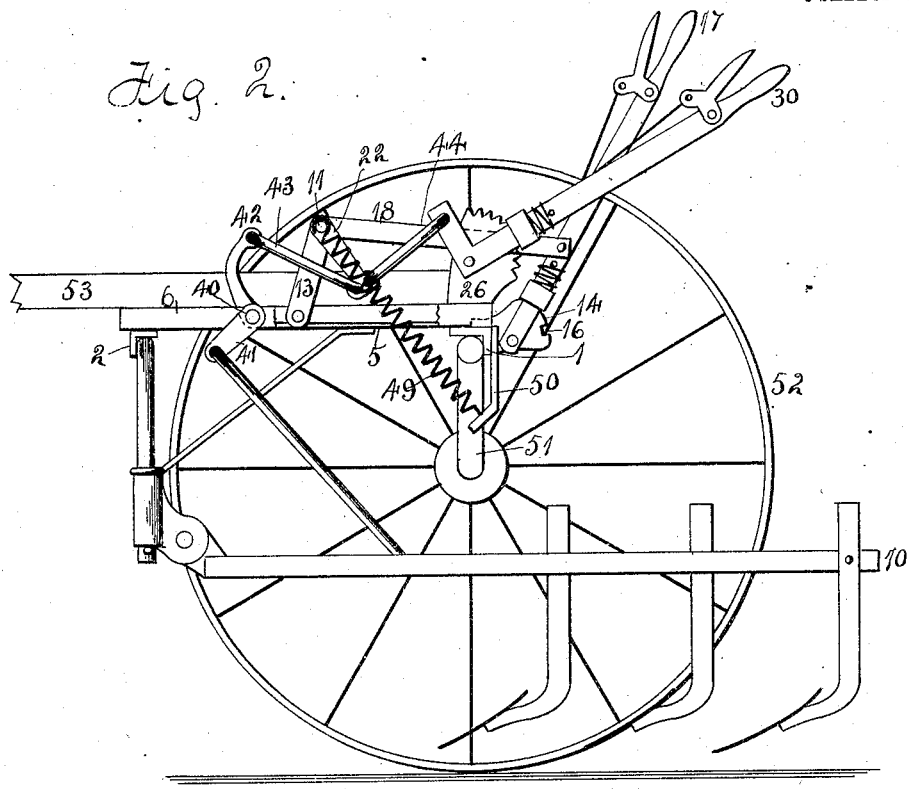
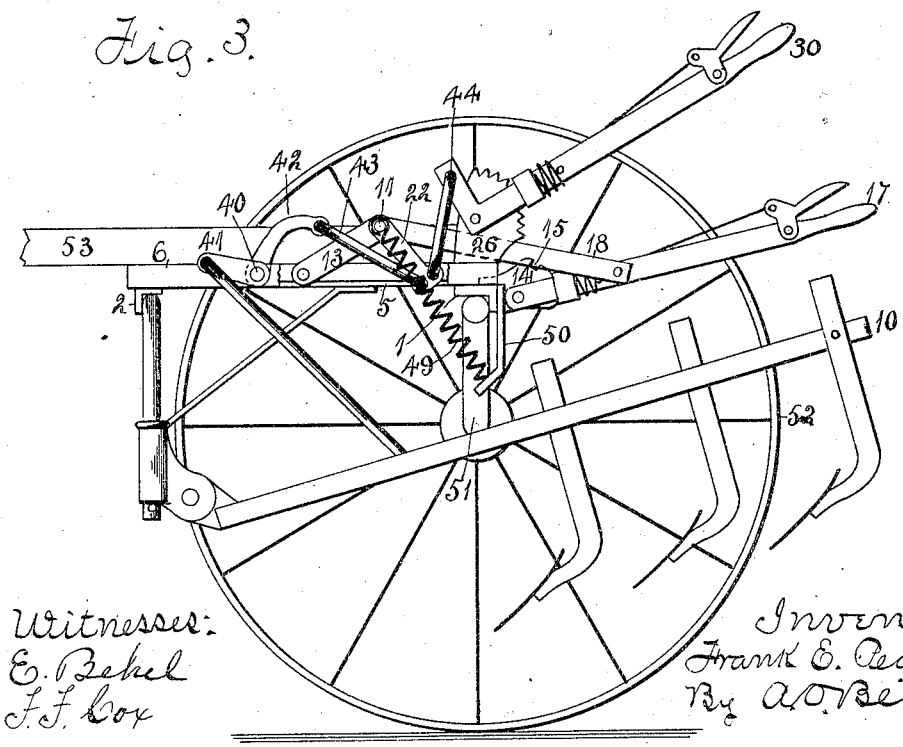

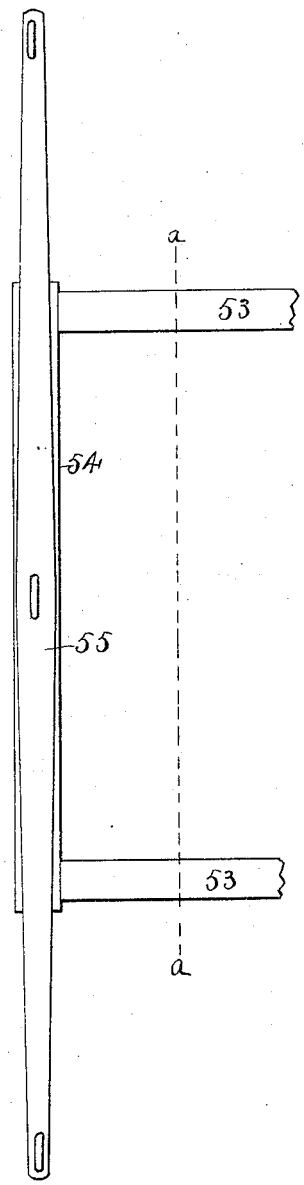
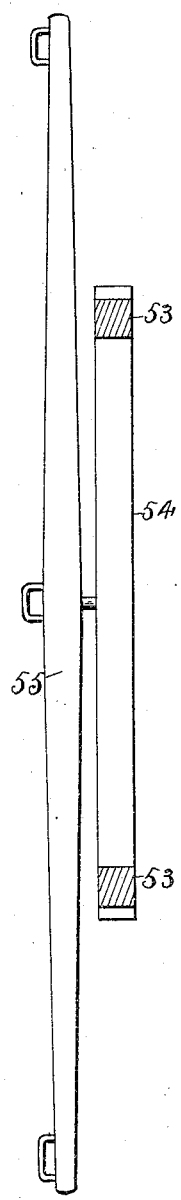
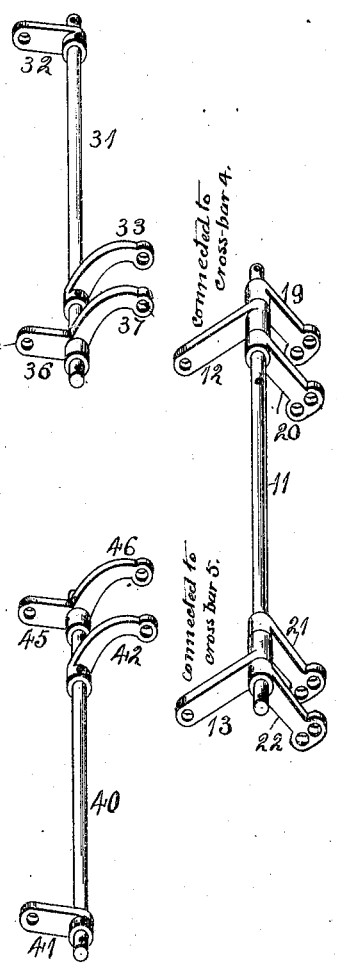

No. 789,104.                                                              Patented May 2, 1905.

UNITED STATES PATENT OFFICE.

FRANK E. PEARSON, OF ROCKFORD, ILLINOIS.

TWO-ROW CULTIVATOR.

SPECIFICATION forming part of Letters Patent No. 789,104, dated May 2, 1905.

Application filed October 10, 1904. Serial No. 227,882.

*To all whom it may concern:*

Be it known that I, FRANK E. PEARSON, a citizen of the United States, residing at Rockford, in the county of Winnebago and State of Illinois, have invented certain new and useful Improvements in Two-Row Cultivators, of which the following is a specification.

This invention relates to improvements in two-row cultivators in which each beam is adjusted as to working depth independent of the others and in which all beams are raised and lowered by the movement of a single lever.

This invention further relates to the attachment of the three-horse neck-yoke to the main frame.

In the accompanying drawings, Figure 1 is a plan view of my improvements. Fig. 2 is a side elevation. Fig. 3 is a side elevation with the beams raised. Fig. 4 is a plan view of the forward end of the poles. Fig. 5 is a section on dotted line $a$, Fig. 4. Fig. 6 is an isometrical representation of the oscillating rods for raising the beams.

The main frames consist of the two longitudinal angle-bars 1 and 2, held separated by the cross-bars 3, 4, 5, and 6. The four shovel-supporting beams 7, 8, 9, and 10 have the usual connection with the angle-bar 2. A rod 11 is supported by links 12 and 13, pivotally connected to the cross-bars 4 and 5.

A quadrant 14, formed with two notches 15 and 16, is rigidly connected to the angle-bar 1, and a hand-lever 17 has a pivotal connection with the quadrant 14 and is provided with the usual thumb-lever and dog engagement with the quadrant. Two links 18 have one end pivotally connected to the hand-lever 17 and their other ends pivotally connected to the rod 11, and by means of this hand-lever the rod 11 can be rocked on its linked support and held in its two extended positions. This rod supports four arms 19, 20, 21, and 22 in a pivotal manner, which depend from the rod, and each has two perforations in its free end.

The angle-bar 1 supports four toothed quadrants 23, 24, 25, and 26, and four hand-levers 27, 28, 29, and 30 are provided for the quadrants, one for each, and each has an extension turned at right angles to the length of the lever and perforated. Each of the hand-levers 27, 28, 29, and 30 is provided with the usual thumb-lever and dog connection with its toothed quadrant.

A rock-shaft 31 is pivotally supported by the cross-bars 3 and 4 forward of the rod 11 and has an arm 32 rigidly connected to it. This arm has a link connection with the beam 7. An arm 33 also has a fixed connection with the rock-shaft 31, and its free end has a connection with the arm 19 by the link 34. This arm 19 has a connection with the short arm of the hand-lever 27 by the link 35.

Upon the rock-shaft 31 is loosely mounted a double lever comprising the arms 36 and 37. The arm 36 has a link connection with the beam 8, and the arm 37 has a connection by the link 38 with the arm 20, depending from the rod 11. A link 39 forms a connection between the arm 20 and the short arm of the hand-lever 28. By means of the hand-lever 27 the rock-shaft is oscillated, and by reason of the arm 32 having a connection with the beam 7 the beam 7 will be raised or lowered and held in its adjusted position. By means of the hand-lever 28 the double lever is oscillated on the rock-shaft, which through its linked connection with the beam 8 the beam can be raised and lowered and held in its adjusted position.

A rock-shaft 40 is pivotally supported by the cross-bars 5 and 6 forward of the rod 11 and has an arm 41 rigidly connected to it. This arm has a connection with the beam 10. An arm 42 also has a fixed connection with the rock-shaft 40, and its free end has a connection with the arm 22 by the link 43. This arm 22 has a connection with the short arm of the hand-lever 30 by the link 44.

Upon the rock-shaft 40 is loosely mounted a double lever comprising the arms 45 and 46. The arm 45 has a link connection with the beam 8, and the arm 46 has a connection by the link 47 with the arm 21, depending from the rod 11. A link 48 forms a connection between the arm 21 and the short arm of the hand-lever 29. By means of the hand-lever 30 the rock-shaft is oscillated, and by reason of the arm 41 having a connection with the beam 10 the beam 10 will be raised or lowered and held in its adjusted position. By means of the hand-lever 29 the double lever is oscillated on the rock-shaft, which through its linked connection with the beam 9 the beam can be raised and lowered and held in its adjusted position.

Without changing the adjustments of the hand-levers 27, 28, 29, and 30 all of the beams can be raised by means of the hand-lever 17, which will rock the rod 11 rearward and downward, and as the arms 19, 20, 21, and 22 are suspended from this rod they will be carried with it, and as the free ends of the arms are guided by their connection with the lifting-levers 27, 28, 29, and 30 it will be seen that the arms 19, 20, 21, and 22 will be rocked rearward, thereby rocking the arms 32, 36, 41, and 45 upward, and consequently raising all the beams in unison, which can be held elevated by the dog of the lifting-lever engaging the notch 16 of the quadrant 14. By moving the hand-lever 17 forward all the beams will fall and the lever may be locked in the notch 15 of the quadrant 14.

To each end of the rod 11 is connected a coiled spring 49. The other ends of the springs have a connection with the brackets 50, depending from the angle-bar 1. The action of these springs is to assist in raising the beams, and when the hand-lever 17 is locked in its forward position the influence of the springs is removed. The springs exert no influence upon the beams when adjusted by the hand-levers 27, 28, 29, and 30.

To the angle-bar 1 are connected two axles 51, upon which are placed the supporting-wheels 52.

The angle-bars 1 and 2 have two poles or shafts 53 rigidly connected thereto and have their forward ends rigidly connected by an end bar 54. A three-horse neck-yoke 55 has a connection with the end bar 54. A three-horse evener 56 has a swivel connection with the angle-bar 2. In use the center horse occupies the space between the shafts or poles 53 and one horse is located outside of each of the shafts or poles.

I claim as my invention—

1. In a two-row cultivator, the combination of a main frame, four beams supported by the main frame, links pivotally connected to the frame and capable of a swinging movement, a rod supported by the links, connections between the rod and the beams, and a hand-lever for rocking the links.

2. In a two-row cultivator, the combination of a main frame, four beams supported by the main frame, a rod, links pivotally connecting the rod with the main frame, a hand-lever for rocking the rod, two rock-shafts supported by the main frame, two beams having a connection with each rock-shaft, a connection between each rock-shaft and the rod, and a hand-lever for each beam.

3. In a two-row cultivator, the combination of a main frame, four beams supported by the main frame, a rod, links pivotally connecting the rod with the main frame, a hand-lever for rocking the rod, two rock-shafts supported by the main frame, each rock-shaft having a connection with a beam, a bell-crank arm loosely mounted on each rock-shaft and each having a connection with a beam, four bell-crank arms loosely mounted on the rod, a connection between two of the bell-crank arms on the rod and the rock-shafts, a connection between the other two bell-crank arms on the rod and the bell-crank arms on the rock-shafts, and a hand-lever having a connection with each of the bell-crank arms mounted on the rod.

FRANK E. PEARSON.

Witnesses:
 A. O. BEHEL,
 E. BEHEL.